May 17, 1932.  R. A. GOEPFRICH  1,858,667
BRAKE
Filed Aug. 29, 1929
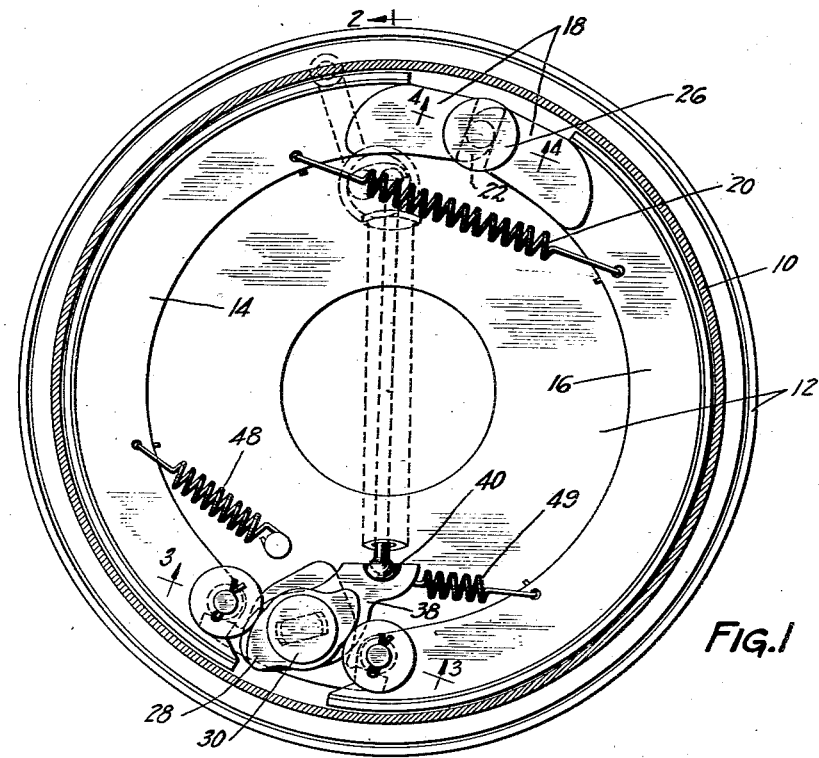
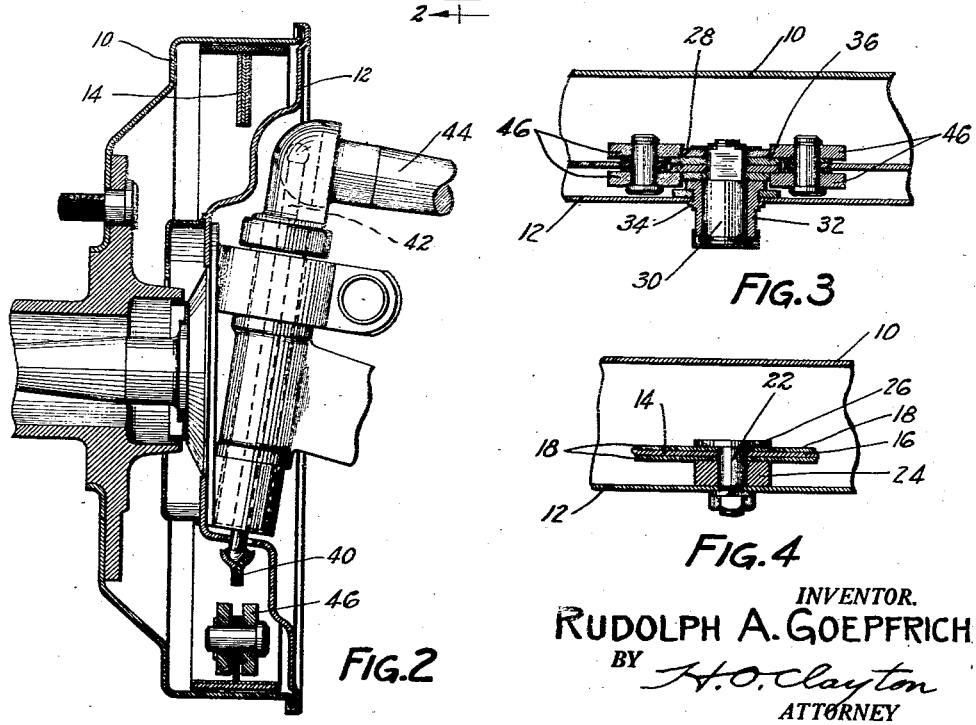
INVENTOR.
RUDOLPH A. GOEPFRICH
BY H. O. Clayton
ATTORNEY Patented May 17, 1932

1,858,667

UNITED STATES PATENT OFFICE

RUDOLPH A. GOEPFRICH, OF SOUTH BEND, INDIANA, ASSIGNOR TO BENDIX BRAKE COMPANY, OF SOUTH BEND, INDIANA, A CORPORATION OF ILLINOIS

BRAKE

Application filed August 29, 1929. Serial No. 389,147.

This invention relates to brakes and is illustrated as embodied in an internal expanding type of automobile brake.

An object of the invention resides in the provision of a novel applying means for the friction elements of this type of brake wherein the pressures transmitted to the said friction elements are balanced by a novel two-part cam having a synchronized rotary and lineal movement with respect to a supporting cam shaft. The shaft is adapted to be rotated to apply the cam through the intermediary of an arm extending therefrom, which arm is secured to the shaft between the cam parts and is adapted to be actuated at its end by a member housed within the steering knuckle of the wheel extending longitudinally therethrough.

A further object of my invention lies in the provision of an applying means floating to balance the pressure applied to the elements of the brake and actuated by means unaffected by the swiveling movement of the wheel and brake mounting.

Further objects and features of my invention, including desirable particular constructions and combinations of parts will be apparent from the following detailed description of one preferred embodiment of my invention taken in conjunction with the disclosure of the drawings, in which:

Figure 1 is a section taken through the head of the brake drum immediately adjacent the inner side of the wheel and showing the elements of my novel brake in side elevation;

Figure 2 is a vertical transverse section through the wheel and brake parts, the section being taken on the line 2—2 of Figure 1;

Figure 3 is a transverse section taken on the line 3—3 of Figure 1 and disclosing in detail parts of my novel applying mechanism; and Figure 4 is a section taken on the line 4—4 of Figure 1 indicating the means for anchoring the parts of the brake.

As disclosed in Figure 2, a brake drum 10 is secured to the hub of the wheel, which drum is closed on its open side by a backing plate 12 which supports the elements of my novel brake including two T-sectioned interchangeable shoes 14 and 16 reinforced at their upper ends by plates 18 on either side of the web of the shoes. The reinforced ends are drawn by means of a tension spring 20 into engagement with a two-lobe cam type of anchor 22 which is fixedly mounted in the backing plate 12. A reinforcing block 24 interposed between the ends of the brake shoes and the backing plate and an end flange 26 extending from the cam serve to confine the ends of the shoe laterally.

According to an important feature of my invention, the brake shoes are expanded into drum engagement by means of a novel applying means comprising two two-lobe cam plates 28 juxtaposed in parallel and rectangularly slotted at their centers to accommodate parallel flats on the end of a cam shaft 30 journaled in a bearing 32 fixedly secured to the backing plate 12 by means of a flange 34 upset in accordance with the provisions of an application of one Stanley Whitworth filed May 7, 1928, Serial No. 275,886, completely describing and claiming the feature. The parallel stampings constituting the cam portions of the applying means are preferably spaced by a novel two-part crank arm 36, which arm is extended at 38 and shaped in its end to provide a hemispherical recess 40. The recess 40 in the end of the arm is adapted to receive the semispherical end of a brake actuating compression link 42 extending longitudinally through aligned openings in the axle and steering knuckle and which link is adapted to be thrust downwardly by means of a novel actuating mechanism 44, forming no part of my invention.

In operation, with the downward thrust of the link 42 the arm 36, which fits securely about the flats on the shaft, is actuated to rotate the shaft which in turn rotates the cams to apply force to parallel rollers 46 pivotally mounted on either side of the webs of the shoes 14 and 16, which rollers are kept in constant engagement with the cam parts by virtue of the tension springs 48 and 49. Inasmuch as the slots in the cam plates are of greater length than the width of the cam shaft, said cam plates are accordingly adapted to float on said flats to balance the pressure applied to the respective ends of the shoes 14 and 16. Even lining wear, avoidance of distortion of the drum and other meritorious effects result from the equalization of the forces applied to the ends of the shoes, the braking torque in either direction of drum rotation being taken by one or the other of the lobes of the cam anchor, which may be rotated to compensate for lining wear.

Excessive pressures which would result in the locking of the brake are to a certain extent obviated by the effect of one or the other of the shoes in offsetting the movement of the arm 36. With the drum rotating clockwise, the end of the shoe 16 is applied but at the same time wiped by the revolving drum into contact with the arm 36 to offset its movement under the action of the compression link 42. The remaining shoe 14 which with this movement of the drum does practically all of the work is wiped into full drum engagement by the revolving drum, this shoe being fully self-energizing and the torque thereof being taken by the lower lobe of the cam. With reverse movement of the brake, the opposite effect results, shoe 16 in this instance becoming the more effective self-energized unit.

While but one embodiment of my invention has been disclosed and described in detail, it is not my intention to limit the scope of the invention thereto, but only so far as may be defined within the scope of the appended claims.

I claim:

1. A brake comprising a rotatable drum, friction elements within the drum and applying means therefor including a shaft, a two-part floating cam on the shaft and an arm fixedly mounted on a shaft between the cam parts.

2. A brake comprising a rotatable drum, friction elements within the drum and applying means therefor including a rotatable shaft, a two-part floating cam on the shaft, an arm secured on a shaft intermediate the parts of said cam and a thrust receiving member on the arm.

3. A brake comprising spaced apart friction elements and means for spreading said elements still further apart to apply the brake comprising a plurality of parallel cam parts, at least two of said parts slidingly and non-rotatably mounted in a cam shaft, together with means for rotating said shaft comprising an arm fixedly secured to the shaft by that portion thereof which permits the aforementioned cam parts to slide thereon.

4. A brake comprising, in combination, a rotatable drum, floating friction elements within the drum and applying means therefor comprising shiftable applying devices mounted directly upon a cam shaft, said applying devices lying between separable ends of said friction means to rotate with the shaft to actuate said ends to automatically slide over the shaft, together with the crank arm interposed between said devices and arranged to be actuated to rotate the shaft.

5. A brake applying device including a shaft having a flattened portion, in combination with a pair of applying devices slotted to embrace said flattened portions of the shaft, and a two-part arm interposed between said devices for encircling the shaft, said arm adapted to be angularly rotated by a lineally movable compression link.

6. A brake comprising a rotatable drum, a brake structure operating within said drum including an adjustable anchor member, floating friction devices disconnectedly engaging said anchor member, thrust elements on the friction devices, a rotatable shaft between the thrust elements, a two part cam slidable on the shaft and means intermediate the parts of the cam for applying the cam with equal forces to the respective friction devices.

7. A brake applying device including a shaft having a flattened portion in combination with a pair of parallel applying devices of irregular outline slotted to embrace said flattened portion of the shaft, and means for rotating said shaft including contiguous plates interposed between said devices and constituting an arm, said arm being recessed in the end thereof to provide a hemispherical cup to receive the ball end of a compression link movable lengthwise to actuate said arm.

8. A brake comprising a rotatable shaft having flats, spaced members slidable on the flats, an arm sleeved on the shaft intermediate the members having shoulders engaging the flats and a thrust receiving member on the arm.

In testimony whereof, I have hereunto signed my name.

RUDOLPH A. GOEPFRICH.